(12) United States Patent
Hadano et al.

(10) Patent No.: US 11,938,785 B2
(45) Date of Patent: Mar. 26, 2024

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Hiroyasu Hadano, Toyota (JP); Takaaki Inokuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 17/546,484

(22) Filed: Dec. 9, 2021

(65) Prior Publication Data
US 2022/0242196 A1    Aug. 4, 2022

(30) Foreign Application Priority Data

Feb. 4, 2021    (JP) ................. 2021-016536

(51) Int. Cl.
*B60H 1/00*    (2006.01)
(52) U.S. Cl.
CPC ..... *B60H 1/00742* (2013.01); *B60H 1/00985* (2013.01)

(58) Field of Classification Search
CPC ............ B60H 1/00742; B60H 1/00985; B60H 1/00657; B60H 1/00771
See application file for complete search history.

(56) References Cited

U.S. PATENT DOCUMENTS

| | | | |
|---|---|---|---|
| 2018/0222281 A1 | 8/2018 | Tamane et al. | |
| 2018/0222283 A1* | 8/2018 | Tamane | B60H 1/00742 |
| 2020/0156593 A1* | 5/2020 | Boss | B60S 1/3463 |
| 2021/0031630 A1* | 2/2021 | Brunbäck | B60W 40/08 |
| 2021/0053515 A1* | 2/2021 | Dombrovskis | B60H 1/00771 |
| 2022/0153227 A1* | 5/2022 | Srivastava | B60H 1/265 |

FOREIGN PATENT DOCUMENTS

| | | |
|---|---|---|
| JP | 2018-122837 A | 8/2018 |
| JP | 2018-122838 A | 8/2018 |

* cited by examiner

*Primary Examiner* — Nelson J Nieves
*Assistant Examiner* — Matthew John Moscola
(74) *Attorney, Agent, or Firm* — Sughrue Mion, PLLC

(57) ABSTRACT

An information processing device includes a control unit. The control unit extends an operating time of an air conditioner provided in a vehicle when the control unit determines that a user is present within a predetermined range from the vehicle at a predetermined timing when a predetermined operating time has elapsed from a start of pre-air conditioning inside the vehicle by the air conditioner.

16 Claims, 4 Drawing Sheets

INFORMATION PROCESSING DEVICE, INFORMATION PROCESSING METHOD, AND SYSTEM

CROSS-REFERENCE TO RELATED APPLICATION

This application claims priority to Japanese Patent Application No. 2021-016536 filed on Feb. 4, 2021, incorporated herein by reference in its entirety.

BACKGROUND

1. Technical Field

The present disclosure relates to pre-air conditioning in a vehicle.

2. Description of Related Art

Japanese Unexamined Patent Application Publication No. 2018-122837 (JP 2018-122837 A) discloses a remote air conditioning starting system. In the remote air-conditioning start system disclosed in JP 2018-122837 A, the center server receives the start request of an air conditioner transmitted from the user terminal. In addition, the center server transmits a request to start the air conditioner to the vehicle. In the vehicle, the air conditioner is started when the start request is received. In addition, when it is determined that defrosting of the window of the vehicle is necessary, a notification is transmitted to the user terminal via the server. When the user who receives the notification changes the set operating time of the air conditioner via the user terminal, an operating time change request is transmitted to the vehicle via the server.

SUMMARY

An object of the present disclosure is to provide a technique capable of improving user convenience when the user performs pre-air conditioning of a vehicle.

An information processing device according to a first aspect of the present disclosure includes a control unit that extends an operating time of an air conditioner provided in a vehicle when the control unit determines that a user is present within a predetermined range from the vehicle at a predetermined timing when a predetermined operating time has elapsed from a start of pre-air conditioning inside the vehicle by the air conditioner.

An information processing method according to a second aspect of the present disclosure is an information processing method executed by a computer, and includes: executing a predetermined determination process of determining whether a user is present within a predetermined range from a vehicle at a predetermined timing when a predetermined operating time has elapsed from a start of pre-air conditioning inside the vehicle by an air conditioner provided in the vehicle; and extending, in the predetermined determination process, an operating time of the air conditioner when the user is determined to be present within the predetermined range from the vehicle.

A system according to a third aspect of the present disclosure is a system including an air conditioner provided in a vehicle, an information processing device provided in the vehicle, and a user terminal owned by a user. In the system, the user terminal transmits a remote signal to the vehicle to start pre-air conditioning in the vehicle, and when the remote signal is received in the vehicle, the information processing device transmits, to the air conditioner, an operation command for operating the air conditioner for a predetermined operating time.

Further, the information processing device determines whether the user is present within a predetermined range from the vehicle at a predetermined timing when a predetermined operating time has elapsed from a start of the pre-air conditioning by the air conditioner based on the operation command, and transmits an extension command for extending an operating time of the air conditioner when the user is determined to be present within the predetermined range from the vehicle.

According to the present disclosure, user convenience when the user performs pre-air conditioning of the vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device according to the present disclosure includes a control unit that controls an air conditioner provided in a vehicle. The control unit executes pre-air conditioning inside the vehicle using an air conditioner. The pre-air conditioning is air conditioning executed inside the vehicle before a user boards the vehicle. When the pre-air conditioning by the air conditioner is started, the air conditioner operates for a predetermined operating time. That is, the pre-air conditioning is continuously executed for the predetermined operating time unless the user boards the vehicle in the middle of the pre-air conditioning.

Then, the control unit determines whether the user is present within a predetermined range from the vehicle at a predetermined timing. Here, the predetermined timing is the timing at which the predetermined operating time has elapsed after the start of the pre-air conditioning. When the user is still present around the vehicle at the predetermined timing, it is highly likely that the user boards the vehicle in the near future after the predetermined timing. At this time, when the operation of the air conditioner is stopped at the predetermined timing, the temperature inside the vehicle that approaches the optimum temperature by the pre-air conditioning may deviate from the optimum temperature by the time the user boards the vehicle.

Therefore, the control unit extends the operating time of the air conditioner when it is determined that the user is present within the predetermined range from the vehicle at the predetermined timing. With this configuration, the pre-air conditioning by the air conditioner is continued even after the predetermined operating time has elapsed from the start of the pre-air conditioning. Therefore, the temperature inside the vehicle can be suppressed from deviating from the optimum temperature after the predetermined timing until the user boards the vehicle. Therefore, according to the present disclosure, user convenience when the user executes the pre-air conditioning of the vehicle can be improved.

Hereinafter, embodiments of the present disclosure will be described below with reference to the drawings. Unless otherwise specified, dimensions, materials, shapes, relative arrangements, and the like of components described in the present embodiments are not intended to limit the technical scope of the present disclosure to those alone.

First Embodiment

System Overview

Figure 1:
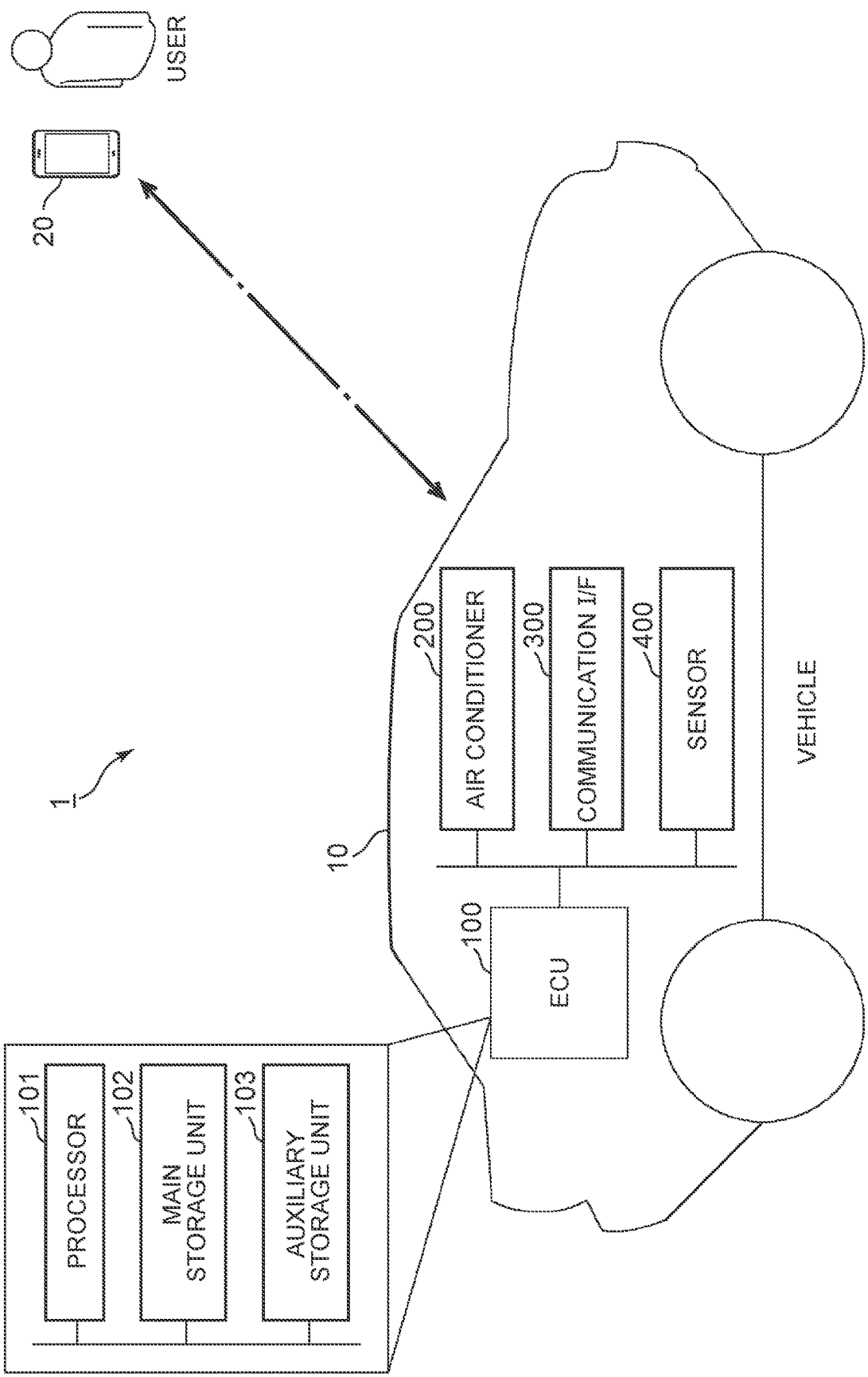
FIG. 1 is a diagram showing a schematic configuration of an air conditioning system according to an embodiment.

FIG. 1 is a diagram showing a schematic configuration of an air conditioning system according to the present embodiment. An air conditioning system 1 is a system for executing pre-air conditioning in a vehicle 10. The pre-air conditioning is air conditioning executed in the vehicle 10 before a user boards the vehicle 10. The pre-air conditioning is executed, for example, when the outside air temperature is low and the user desires to raise the temperature inside the vehicle 10 before boarding the vehicle 10. The pre-air conditioning is also executed when the user desires to defrost the window or remove snow from the window of the vehicle 10 before boarding the vehicle 10.

The air conditioning system 1 includes an electronic control unit (ECU) 100, an air conditioner 200, a communication interface (communication I/F) 300, a sensor 400, and a user terminal 20. The ECU 100, the air conditioner 200, the communication I/F 300, and the sensor 400 are mounted on the vehicle 10. The user terminal 20 is a terminal owned by the user. In the air conditioning system 1, wireless communication is performed between the vehicle 10 and the user terminal 20.

The user terminal 20 is a terminal operated by the user. Examples of the user terminal 20 include smartphones, tablet computers, mobile computers, and wearable computers. A predetermined application for using the air conditioning system 1 is executed with the user terminal 20. Then, when the user operates the user terminal 20, a remote signal for starting the pre-air conditioning in the vehicle is transmitted from the user terminal 20 to the vehicle 10.

The air conditioner 200 is a device that performs air conditioning of the inside of the vehicle 10. The air conditioner 200 may include, for example, a heater that uses coolant of the engine as a heat source. Further, the air conditioner 200 may be configured to include, for example, a cooler that cools refrigerant by a compressor driven by an engine. However, the vehicle 10 is not limited to a vehicle provided with an engine as a drive source, and may be an electric vehicle. Therefore, the configuration of the heater or cooler included in the air conditioner 200 is not limited to the configuration using coolant of the engine or the driving force of the engine.

The communication I/F 300 is an interface for performing wireless communication between the vehicle 10 and the user terminal 20. The communication I/F 300 is configured to include a wireless communication circuit for wireless communication. The communication I/F 300 directly communicates with the user terminal 20 using a predetermined short-range wireless communication standard. As a predetermined short-range wireless communication standard, Bluetooth (registered trademark) Low Energy standard or WiFi (registered trademark) can be exemplified. The communication I/F 300 may communicate with the user terminal 20 via a network according to a predetermined wireless communication standard. As a predetermined wireless communication standard, the third generation (3G), long term evolution (LTE), or the fifth generation (5G) can be exemplified.

The sensor 400 is a sensor for detecting an electronic key (for example, a smart key) present within the predetermined range from the vehicle 10. The electronic key detected by the sensor 400 is an electronic key associated with the vehicle 10 in advance. The sensor 400 may detect the electronic key by polling. The sensor 400 is installed, for example, on each doorknob of the vehicle 10. When the user who possesses the electronic key associated with the vehicle 10 is present within the predetermined range from the vehicle 10, the electronic key is detected by the sensor 400.

The ECU 100 is a computer for controlling the air conditioner 200. The ECU 100 includes a processor 101, a main storage unit 102, and an auxiliary storage unit 103. The processor 101 is, for example, a central processing unit (CPU) or a digital signal processor (DSP). The main storage unit 102 is, for example, a random access memory (RAM). The auxiliary storage unit 103 is, for example, a read-only memory (ROM), a hard disk drive (HDD), or a flash memory. Further, the auxiliary storage unit 103 may include a removable medium (portable recording medium). Here, the removable medium is, for example, a universal serial bus (USB) memory, a secure digital (SD) card, or a disc recording medium such as a compact disc read-only memory (CD-ROM), a digital versatile disc (DVD), or a Blu-ray disc.

The auxiliary storage unit 103 stores an operating system (OS), various programs, various information tables, and the like. Then, the processor 101 loads a program stored in the auxiliary storage unit 103 into the main storage unit 102 and executes the program, whereby control of the air conditioner 200 as described later can be realized. However, some or all of the functions of the ECU 100 may be implemented by a hardware circuit such as an application specific integrated circuit (ASIC) or a field programmable gate array (FPGA). Note that, the ECU 100 may not be necessarily realized by a single physical configuration, and may be configured by a plurality of computers that cooperates with each other.

In the vehicle 10, communication is performed between the ECU 100 and the air conditioner 200, the communication I/F 300, and the sensor 400 via an in-vehicle network. In the in-vehicle network, communication is performed using a predetermined in-vehicle communication standard. As the predetermined in-vehicle communication standard, controller area network (CAN) or local interconnect network (LIN) can be exemplified.

In the air conditioning system 1, when a remote signal is transmitted from the user terminal 20 to the vehicle 10, the remote signal is received by the communication I/F 300. Then, when the remote signal is received by the communication I/F 300 in the vehicle 10, the ECU 100 transmits an operation command to the air conditioner 200. The operation command includes information for operating the air conditioner 200 for a predetermined operating time. When the air conditioner 200 receives an operation command from the ECU 100, the air conditioner 200 operates. With this configuration, the pre-air conditioning inside the vehicle 10 is started.

Here, as described above, the pre-air conditioning is executed before the user boards the vehicle 10. Therefore, in the pre-air conditioning, a predetermined operating time is set so as to limit energy consumption for operating the air conditioner 200. The predetermined operating time is the upper limit of the operating time of the air conditioner 200 in the pre-air conditioning. The energy consumption for operating the air conditioner 200 is, for example, the fuel consumption of the vehicle 10 or the battery consumption of the vehicle 10. Therefore, normally, in the pre-air conditioning, when the user does not get on the vehicle 10 from the start of the operation of the air conditioner 200 until the elapse of the predetermined operation time, the operation of the air conditioner 200 is stopped at the timing when the predetermined operating time has elapsed. Hereinafter, the timing at which a predetermined operating time has elapsed after the operation of the air conditioner 200 is started may be referred to as a "predetermined timing".

However, even when the user has not boarded the vehicle 10 by the predetermined timing, the user may board the vehicle 10 in the near future after the predetermined timing. For example, before boarding the vehicle 10, the user may perform a snow removal operation for removing snow accumulated on and around the vehicle 10 while the air conditioner 200 is executing the pre-air conditioning. In such a case, the snow removal operation by the user may not be completed from the start of pre-air conditioning in the vehicle 10 until the elapse of the predetermined operating time. However, the user boards the vehicle 10 when the snow removal operation is completed in the near future after the predetermined timing.

As described above, when the operation of the air conditioner 200 is stopped at the predetermined timing despite the situation where the user is likely to board the vehicle 10 in the near future, the temperature inside the vehicle that approaches the optimum temperature by the pre-air conditioning may deviate from the optimum temperature by the time the user boards the vehicle 10. Therefore, in the air conditioning system 1, when the pre-air conditioning is executed, the ECU 100 executes a predetermined determination process at the predetermined timing. Here, the predetermined determination process is a process of determining whether the user is present within the predetermined range from the vehicle 10. Then, when the ECU 100 determines in the predetermined determination process that the user is present within the predetermined range from the vehicle 10, the ECU 100 extends the operating time of the air conditioner 200.

Functional Configuration

Figure 2:
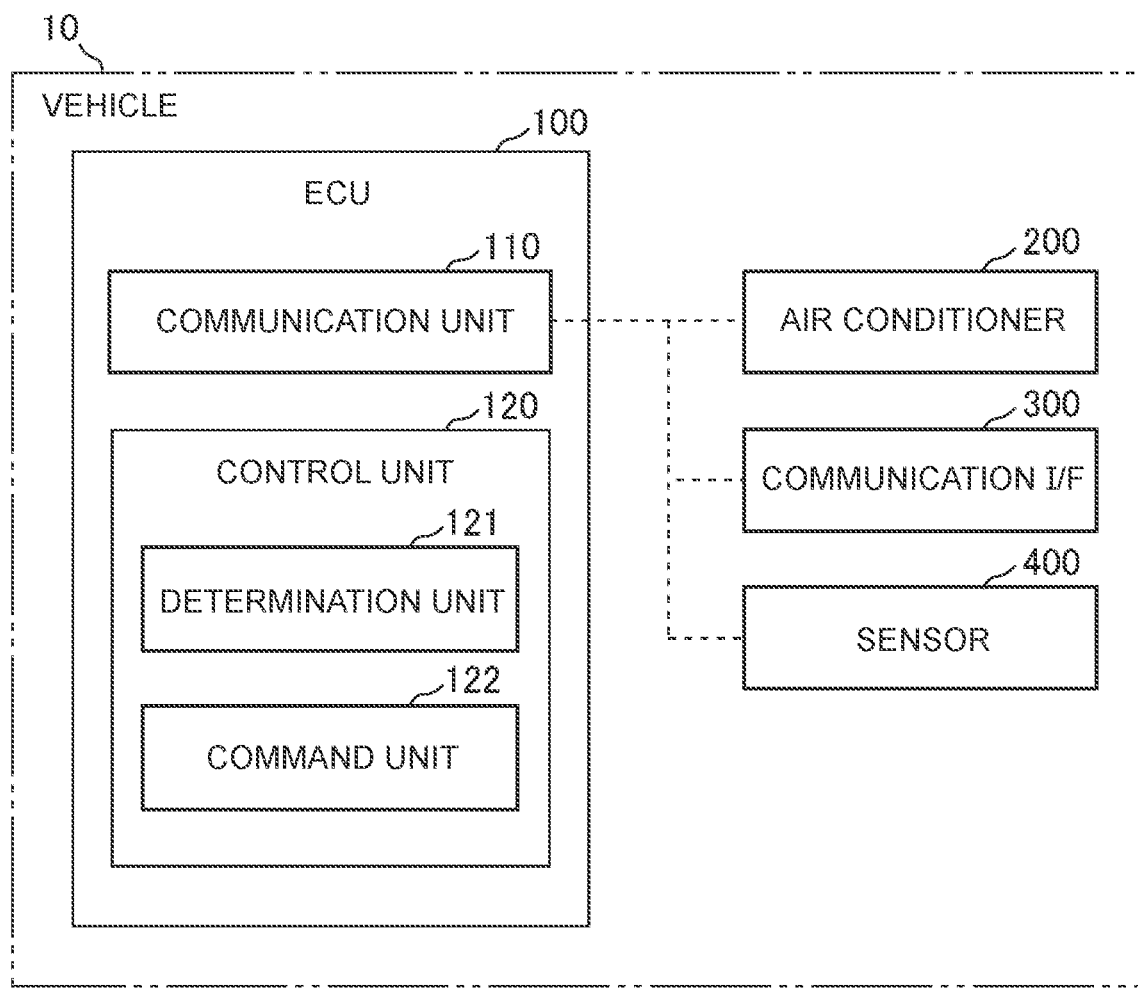
FIG. 2 is a block diagram schematically showing an example of a functional configuration of an electronic control unit (ECU)

Next, a functional configuration of the ECU 100 constituting the air conditioning system 1 according to the present embodiment will be described with reference to FIG. 2. FIG. 2 is a block diagram schematically showing an example of the functional configuration of the ECU 100.

The ECU 100 includes a communication unit 110 and a control unit 120 as functional units. The communication unit 110 has a function of connecting the ECU 100 to the in-vehicle network. The ECU 100 uses the communication unit 110 to communicate with the air conditioner 200, the communication I/F 300, and the sensor 400. The communication unit 110 can be realized by a communication interface for the in-vehicle network provided in the ECU 100.

The control unit 120 has a function of performing arithmetic processing for controlling the ECU 100. The control unit 120 can be realized by the processor 101. The control unit 120 executes a process of receiving the remote signal transmitted from the user terminal 20 and received by the communication I/F 300 using the communication unit 110. Further, the control unit 120 executes a process of transmitting an operation command to the air conditioner 200 using the communication unit 110. Further, the control unit 120 executes a process of receiving the detection data of the sensor 400 using the communication unit 110.

The control unit 120 includes a determination unit 121 and a command unit 122. The determination unit 121 has a function of executing the predetermined determination process when the pre-air conditioning is executed. The command unit 122 has a function of transmitting various commands to the air conditioner 200.

More specifically, the determination unit 121 executes the predetermined determination process at the predetermined timing when the predetermined operating time has elapsed after the start of the operation of the air conditioner 200. Here, the predetermined determination process is executed based on the detection data received from the sensor 400. As described above, when the user who possesses the electronic key associated with the vehicle 10 is present within the predetermined range from the vehicle 10, the electronic key is detected by the sensor 400. Therefore, whether the user is present within the predetermined range from the vehicle 10 can be determined based on whether the electronic key is detected by the sensor 400. The predetermined range may be defined as a range in which the electronic key can be detected by the sensor 400.

As in the above example, when the user is performing the snow removal operation for removing the snow accumulated on and around the vehicle 10, the user is present around the vehicle 10. That is, when the user is present within the predetermined range from the vehicle 10 at the predetermined timing, it can be determined that it is highly likely that the user boards the vehicle 10 in the near future. Therefore, when it is determined that the electronic key is present within the predetermined range from the vehicle 10 in the predetermined determination process executed by the determination unit 121, the command unit 122 transmits an extension command to the air conditioner 200. The extension command contains information for extending the operating time of the air conditioner 200.

In the air conditioner 200, when the extension command is received from the ECU 100, the operating time is extended. That is, the pre-air conditioning by the air conditioner 200 is continued even after the predetermined operating time has elapsed from the start of the pre-air conditioning. According to this, the temperature inside the vehicle can be suppressed from deviating from the optimum temperature after the predetermined timing until the user boards the vehicle 10. Therefore, user convenience when the user performs pre-air conditioning of the vehicle 10 can be improved.

Information Processing

Figure 3:
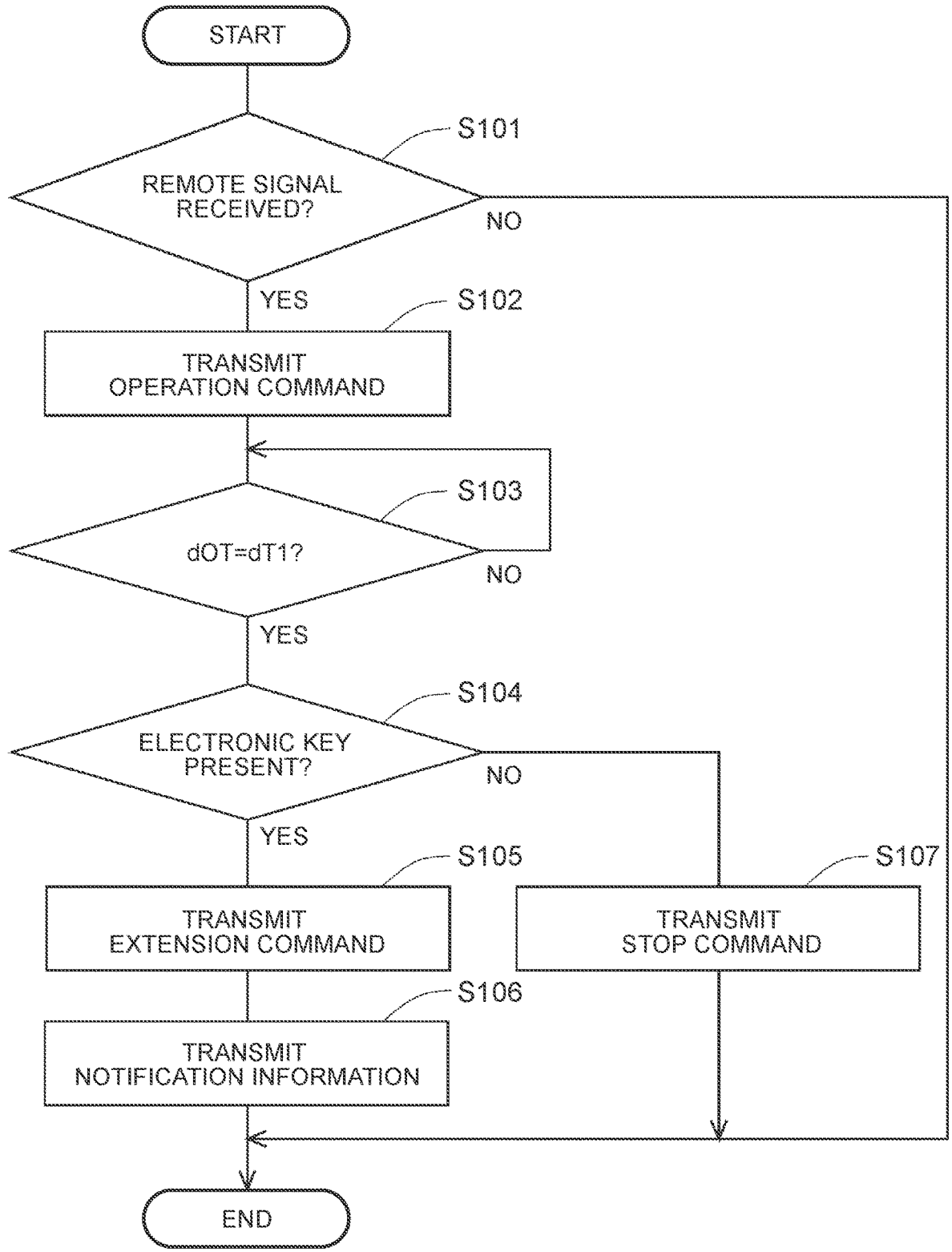
FIG. 3 is a flowchart showing a flow of information processing executed by the ECU according to a first embodiment.

Hereinafter, a flow of information processing executed by the ECU 100 when the pre-air conditioning is executed according to the present embodiment will be described with reference to FIG. 3. FIG. 3 is a flowchart showing the flow of the information processing executed by the ECU 100. The flow is executed by the control unit 120 of the ECU 100. The flow is executed when the user is not in the vehicle 10.

In the flow, first, in S101, the control unit 120 determines whether the remote signal transmitted from the user terminal 20 is received by the communication I/F 300. The remote signal here is a signal requesting execution of the pre-air conditioning. When a negative determination is made in S101, execution of the flow is temporarily stopped. In this case, the pre-air conditioning is not executed in the vehicle 10. When a negative determination is made in S101, the process in S101 is repeatedly executed at predetermined intervals.

On the other hand, when an affirmative determination is made in S101, the process in S102 is executed next. In S102, an operation command for executing the pre-air conditioning is transmitted to the air conditioner 200. As a result, the air conditioner 200 starts the pre-air conditioning inside the vehicle 10. At this time, counting of the elapsed time dOT from the start of the operation of the air conditioner 200 is also started.

Next, in S103, the control unit 120 determines whether the elapsed time dOT from the start of the operation of the air conditioner 200 has reached a predetermined operating time dT1. When a negative determination is made in S103, the process in S103 is executed again. That is, the process in S103 is repeatedly executed until the elapsed time dOT from the start of the operation of the air conditioner 200 reaches the predetermined operating time dT1. When the user boards the vehicle 10 while the process in S103 is repeated, execution of the pre-air conditioning by the air conditioner 200 may be stopped.

On the other hand, when an affirmative determination is made in S103, that is, when a predetermined timing has come, the process in S104 is executed next. In S104, the predetermined determination process is executed. Specifically, based on the detection data of the sensor 400, the control unit 120 determines whether the electronic key is present within a predetermined range from the vehicle 10.

When a negative determination is made in S104, it can be determined that the user is not present within the predetermined range from the vehicle 10. Then, the process in S107 is executed next. In S107, a stop command for stopping the operation of the air conditioner 200 is transmitted to the air conditioner 200. As a result, the operation of the air conditioner 200 is stopped. That is, the pre-air conditioning by the air conditioner 200 is stopped.

On the other hand, when an affirmative determination is made in S104, it can be determined that the user is present within the predetermined range from the vehicle 10. Then, the process in S105 is executed next. In S105, the extension command for extending the operation of the air conditioner 200 is transmitted to the air conditioner 200. As a result, the operating time of the air conditioner 200 is extended. That is, the pre-air conditioning by the air conditioner 200 is continued.

Next, in S106, notification information is transmitted to the user terminal 20 via the communication I/F 300. The notification information is information for notifying the user that the pre-air conditioning is extended in the vehicle 10. When the notification information is received, the user terminal 20 outputs the notification information. This allows the user to know that the pre-air conditioning is extended in the vehicle 10.

Note that, when the operating time of the air conditioner 200 is extended, the ECU 100 starts counting of the extension period. Then, when the extension period of the operating time of the air conditioner 200 reaches a predetermined extension period, the ECU 100 transmits the stop command to the air conditioner 200. Here, the predetermined extension period may be set as a fixed period. Further, the extension command transmitted from the ECU 100 to the air conditioner 200 may include information related to the extension period of the operating time of the air conditioner 200. With this configuration, even when the operating time of the air conditioner 200 is extended, the operation of the air conditioner 200 is stopped after the predetermined extension period elapses. Therefore, an increase in energy consumption for operating the air conditioner 200 due to the extension of the pre-air conditioning can be limited.

Modification

Here, a modification of the present embodiment will be described. In the vehicle 10, when the user does not board the vehicle 10 from the start of the pre-air conditioning by the air conditioner 200 until the elapse of the predetermined operating time, there may be a case where the user desires to change the temperature inside the vehicle more greatly. For example, as described above, the user may execute the pre-air conditioning to defrost the window or remove snow from the window of the vehicle 10. In this case, it is conceivable that the user desires to promote defrosting or removal of snow from the window of the vehicle 10 by raising the temperature inside the vehicle.

Therefore, in the modification, when the pre-air conditioning is extended, the ECU 100 increases an output of the air conditioner 200 during the extension period of the operating time of the air conditioner 200 as compared with the time from the start of the pre-air conditioning to the predetermined timing. Specifically, for example, the set temperature of the air conditioner 200 in the pre-air conditioning is made higher. With this configuration, it becomes possible to change the temperature inside the vehicle more greatly during the extension period of the pre-air conditioning. Therefore, for example, when the user executes the pre-air conditioning to defrost the window or remove snow from the window of the vehicle 10, the temperature inside the vehicle can be further increased during the extension period of the pre-air conditioning.

Second Embodiment

The schematic configuration of the air conditioning system according to the present embodiment is the same as that of the first embodiment. Further, also in the present embodiment, the same pre-air conditioning as in the first embodiment is executed. Then, when it is determined that the electronic key is present within the predetermined range from the vehicle 10 at the predetermined timing when the predetermined operating time has elapsed after the start of the operation of the air conditioner 200, the operating time of the air conditioner 200 is extended. That is, when the user is present within the predetermined range from the vehicle 10 at the predetermined timing, the pre-air conditioning by the air conditioner 200 is extended. At this time, in the present embodiment, when the pre-air conditioning by the air conditioner 200 is extended, whether the electronic key is present within the predetermined range from the vehicle 10 is determined even during the extension period of the operating time of the air conditioner 200.

As described above, in the air conditioning system 1, when the user is present within the predetermined range from the vehicle 10 at the predetermined timing, the user is likely to board the vehicle 10 in the near future. Therefore, the pre-air conditioning by the air conditioner 200 is extended. However, the user who is present within the predetermined range from the vehicle 10 at the predetermined timing may cancel boarding to the vehicle 10. When the operation of the air conditioner 200 is continued in such a case, the energy for operating the air conditioner 200 is unnecessarily consumed.

Therefore, in the present embodiment, when the state in which the user is not present within the predetermined range from the vehicle 10 continues for a predetermined period or more during the extension period of the operating time of the air conditioner 200, the ECU 100 stops the operation of the air conditioner 200. Here, the predetermined period is a threshold for determining that the user has canceled boarding to the vehicle 10. The predetermined period is shorter than the predetermined extension period of the operating time of the air conditioner 200.

Information Processing

Figure 4:
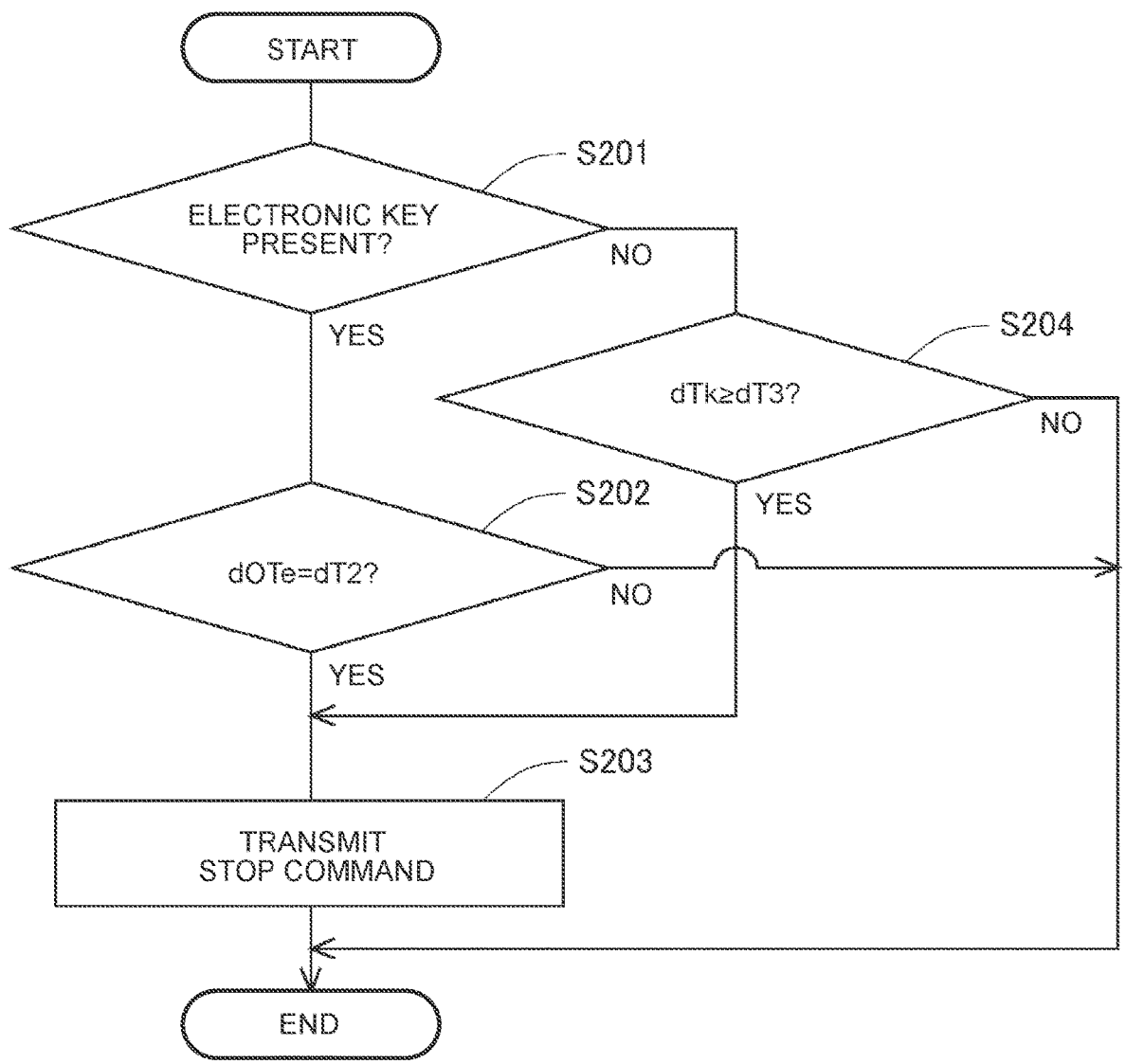
FIG. 4 is a flowchart showing a flow of information processing executed by the ECU according to a second embodiment.

Hereinafter, a flow of information processing executed by the ECU 100 when the pre-air conditioning is extended according to the present embodiment will be described with reference to FIG. 4. FIG. 4 is a flowchart showing the flow of the information processing executed by the ECU 100. The flow is executed by the control unit 120 of the ECU 100. Similar to the flow shown in FIG. 3, the flow is also executed when the user is not in the vehicle 10.

In the flow, first, in S201, the control unit 120 determines whether the electronic key is present within the predetermined range from the vehicle 10 based on the detection data of the sensor 400. On the other hand, when an affirmative determination is made in S201, it can be determined that the user is present within the predetermined range from the vehicle 10. Then, the process in S202 is executed next. In S202, the control unit 120 determines whether an extension period dOTe of the operating time of the air conditioner 200 has reached a predetermined extension period dT2.

When an affirmative determination is made in S202, the process in S203 is executed next. In S203, the stop command for stopping the operation of the air conditioner 200 is transmitted to the air conditioner 200. As a result, the operation of the air conditioner 200 is stopped. That is, the extended pre-air conditioning by the air conditioner 200 is stopped. On the other hand, when a negative determination is made in S202, the execution of the flow is temporarily terminated. Then, the process in S201 is executed next. That is, the process in S201 is executed again while the operation of the air conditioner 200 is continued.

Further, when a negative determination is made in S201, a period dTk during which the electronic key is not present within a predetermined range from the vehicle 10 is counted. Then, the process in S204 is executed next. In S204, the control unit 120 determines whether the period dTk during which the electronic key is not present within the predetermined range from the vehicle 10 has reached a predetermined period dT3 or more. When a negative determination is made in S204, execution of the flow is temporarily terminated. Then, the process in S201 is executed next. That is, the process in S201 is executed again while the operation of the air conditioner 200 is continued.

On the other hand, when an affirmative determination is made in S204, it can be determined that the state in which the user is not present within the predetermined range from the vehicle 10 has continued for the predetermined period of dT3 or more. Then, the process in S203 is executed next. As a result, the operation of the air conditioner 200 is stopped before the extension period dOTe of the operating time of the air conditioner 200 reaches the predetermined extension period dT2.

According to the above flow, when the user cancels boarding to the vehicle 10 during the extension period of the pre-air conditioning by the air conditioner 200, the operation of the air conditioner 200 can be stopped. Therefore, unnecessary consumption of energy for operating the air conditioner 200 can be suppressed.

In the first and second embodiments described above, the ECU 100 determines whether the user is present within the predetermined range from the vehicle 10 based on the detection data of the sensor 400. However, the method of determining whether the user is present within the predetermined range from the vehicle 10 is not limited to such a method. For example, an image of the surroundings of the vehicle 10 may be captured by a camera, and the control unit 120 may determine whether the user is present within the predetermined range from the vehicle 10 based on the captured image.

Further, in the first and second embodiments described above, the air conditioner 200 is controlled by the ECU 100 mounted on the vehicle 10. However, instead of the ECU 100, the air conditioner 200 may be controlled by a server device provided outside the vehicle 10. In this case, communication is performed between the server device, and the user terminal 20 and the vehicle 10 via the network. Further, in this case, the server device corresponds to the "information processing device" according to the present disclosure.

Other Embodiments

The above-described embodiments are merely examples, and the present disclosure may be appropriately modified and implemented without departing from the scope thereof. For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read-only memory (ROM), a random access memory (RAM), an erasable programmable read-only memory (EPROM), an electrically erasable programmable read only memory (EEPROM), a magnetic card, a flash memory, or any type of medium suitable for storing electronic commands such as an optical card.

What is claimed is:

1. An information processing device, comprising a control unit that extends an operating time of an air conditioner provided in a vehicle when the control unit determines that a user is present within a predetermined range from the vehicle at a predetermined timing when a predetermined operating time has elapsed from a start of pre-air conditioning inside the vehicle by the air conditioner, wherein the control unit determines whether the user is present within the predetermined range from the vehicle based on whether an electronic key associated with the vehicle is present within the predetermined range from the vehicle, and the predetermined range is a range where snow removal operation is performed by the user for removing snow accumulated around the vehicle, wherein during the extended operating time of the air conditioner, the control unit increases a first set temperature of the air conditioner inside the vehicle from a second set temperature of the air conditioner, and the second set temperature is a temperature of the air conditioner set during a normal period of the operating time of the air conditioner from the start of the pre-air conditioning to the predetermined timing.

2. The information processing device according to claim 1, wherein when a state in which the user is not present within the predetermined range from the vehicle continues for a predetermined period or more during the extended operating time of the air conditioner, the control unit stops an operation of the air conditioner.

3. The information processing device according to claim 1, wherein when the control unit determines that the user is not present within the predetermined range from the vehicle at the predetermined timing, the control unit stops an operation of the air conditioner.

4. The information processing device according to claim 1, wherein the control unit starts the pre-air conditioning in accordance with a remote signal transmitted from a user terminal possessed by the user.

5. The information processing device according to claim 1, wherein the control unit stops an operation of the air conditioner at a timing when the extended operating time has elapsed.

6. The information processing device according to claim 1, wherein when the operating time of the air conditioner is extended, the control unit notifies the user that the pre-air conditioning is extended.

7. The information processing device according to claim 1, wherein the information processing device is an electronic control unit mounted on the vehicle.

8. An information processing method executed by a computer, the method comprising:

executing a predetermined determination process of determining whether a user is present within a predetermined range from a vehicle at a predetermined timing when a predetermined operating time has elapsed from a start of pre-air conditioning inside the vehicle by an air conditioner provided in the vehicle; and extending, in the predetermined determination process, an operating time of the air conditioner when the user is determined to be present within the predetermined range from the vehicle, wherein whether the user is present within the predetermined range from the vehicle is determined based on whether an electronic key associated with the vehicle is present within the predetermined range from the vehicle, and the predetermined range is a range where snow removal operation is performed by the user for removing snow accumulated around the vehicle, further comprising:

during the extended operation time of the air conditioner, increasing a first set temperature of the air conditioner inside the vehicle from a second set temperature of the air conditioner, wherein the second set temperature is a temperature of the air conditioner set during a normal period of the operating time of the air conditioner from the start of the pre-air conditioning to the predetermined timing.

9. The information processing method according to claim 8, further comprising stopping an operation of the air conditioner when a state in which the user is not present within the predetermined range from the vehicle continues for a predetermined period or more during the extended operating time of the air conditioner.

10. The information processing method according to claim 8, further comprising stopping an operation of the air conditioner when the user is determined to be not present within the predetermined range from the vehicle in the predetermined determination process.

11. The information processing method according to claim 8, wherein the pre-air conditioning is started in accordance with a remote signal transmitted from a user terminal possessed by the user.

12. The information processing method according to claim 8, further comprising stopping an operation of the air conditioner at a timing when the extended operating time has elapsed.

13. The information processing method according to claim 8, further comprising notifying the user that the pre-air conditioning is extended when the operating time of the air conditioner is extended.

14. The information processing method according to claim 8, wherein the computer is an electronic control unit mounted on the vehicle.

15. A system including an air conditioner provided in a vehicle, an information processing device provided in the vehicle, and a user terminal owned by a user, wherein:

the user terminal transmits a remote signal to the vehicle to start pre-air conditioning in the vehicle;

when the remote signal is received in the vehicle, the information processing device transmits, to the air conditioner, an operation command for operating the air conditioner for a predetermined operating time; and further, the information processing device determines whether the user is present within a predetermined range from the vehicle at a predetermined timing when a predetermined operating time has elapsed from a start of the pre-air conditioning by the air conditioner based on the operation command, and transmits an extension command for extending an operating time of the air conditioner when the user is determined to be present within the predetermined range from the vehicle, wherein the information processing device determines whether the user is present within the predetermined range from the vehicle based on whether an electronic key associated with the vehicle is present within the predetermined range from the vehicle, and the predetermined range is a range where snow removal operation is performed by the user for removing snow accumulated around the vehicle, wherein during the extended operating time of the air conditioner, the information processing device increases a first set temperature of the air conditioner inside the vehicle from a second set temperature of the air conditioner, and the second set temperature is a temperature of the air conditioner set during a normal period of the operating time of the air conditioner from the start of the pre-air conditioning to the predetermined timing.

16. The system according to claim 15, wherein when a state in which the user is not present within the predetermined range from the vehicle continues for a predetermined period or more during the extended operating time of the air conditioner, the information processing device transmits a stop command for stopping the operation of the air conditioner.

* * * * *